United States Patent
Baek et al.

(10) Patent No.: US 9,842,182 B2
(45) Date of Patent: Dec. 12, 2017

(54) METHOD AND SYSTEM FOR DESIGNING SEMICONDUCTOR DEVICE

(71) Applicant: SAMSUNG ELECTRONICS CO., LTD., Suwon-si (KR)

(72) Inventors: Sang-Hoon Baek, Seoul (KR); Tae-Joong Song, Seongnam-si (KR); Gi-Young Yang, Seoul (KR); Jeong-Ho Do, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/845,556

(22) Filed: Sep. 4, 2015

(65) Prior Publication Data

US 2016/0098508 A1    Apr. 7, 2016

Related U.S. Application Data

(60) Provisional application No. 62/058,266, filed on Oct. 1, 2014.

(30) Foreign Application Priority Data

Mar. 18, 2015    (KR) .......................... 10-2015-0037521

(51) Int. Cl.
G06F 17/50    (2006.01)
H01L 29/66    (2006.01)

(52) U.S. Cl.
CPC ...... *G06F 17/5072* (2013.01); *G06F 17/5081* (2013.01); *H01L 29/6681* (2013.01)

(58) Field of Classification Search
CPC ......... H01L 21/823431; H01L 29/6681; G06F 17/5068; G06F 17/5072; G06F 2217/12; G06F 17/5031; G06F 17/5081; G06F 2217/78

See application file for complete search history.

(56) References Cited

U.S. PATENT DOCUMENTS

| | | |
|---|---|---|
| 6,987,415 B2 | 1/2006 | Mizuno et al. |
| 7,046,075 B2 | 5/2006 | Mizuno et al. |
| 7,321,252 B2 | 1/2008 | Mizuno et al. |
| 7,475,261 B2 | 1/2009 | Totsuka et al. |
| 7,598,796 B2 | 10/2009 | Mizuno et al. |
| 7,958,379 B2 | 6/2011 | Totsuka et al. |

(Continued)

FOREIGN PATENT DOCUMENTS

| | | |
|---|---|---|
| JP | 11-345881 A | 12/1999 |
| JP | 4803756 B2 | 10/2011 |

(Continued)

*Primary Examiner* — Nha Nguyen
(74) *Attorney, Agent, or Firm* — Sughrue Mion, PLLC

(57) ABSTRACT

A method of designing a semiconductor device and system for designing a semiconductor device are provided. The method of designing a semiconductor device includes providing a standard cell layout which includes an active region and a dummy region; determining a first fin pitch between a first active fin and a second active fin in the active region and a second fin pitch between a first dummy fin and a second dummy fin in the dummy region; placing the first and second active fins in the active region and the first and second dummy fins in the dummy region using the first and second fin pitches; and verifying the standard cell layout.

18 Claims, 9 Drawing Sheets

(56) References Cited

U.S. PATENT DOCUMENTS

| | | |
|---|---|---|
| 8,026,738 B2 | 9/2011 | Hillman et al. |
| 8,302,057 B2 | 10/2012 | Saika |
| 8,364,988 B2 | 1/2013 | Totsuka et al. |
| 8,728,892 B2 | 5/2014 | Ou et al. |
| 9,245,087 B1* | 1/2016 | Schroeder ............. H01L 29/785 |
| 2012/0280331 A1* | 11/2012 | Ou .................... H01L 21/82343 257/401 |
| 2013/0126978 A1 | 5/2013 | Becker et al. |
| 2013/0263077 A1 | 10/2013 | Baek et al. |
| 2014/0077303 A1 | 3/2014 | Baek |
| 2014/0097493 A1* | 4/2014 | Baek .................... H01L 27/1211 257/347 |
| 2014/0131813 A1* | 5/2014 | Liaw .................. H01L 27/1104 257/401 |
| 2014/0203378 A1* | 7/2014 | Ou .................... H01L 21/82343 257/401 |
| 2014/0245248 A1 | 8/2014 | Yang et al. |
| 2014/0258961 A1* | 9/2014 | Ke ...................... G06F 17/5072 716/122 |
| 2014/0325466 A1* | 10/2014 | Ke ...................... G06F 17/5072 716/119 |
| 2014/0339647 A1* | 11/2014 | Rashed ............... G06F 17/5072 257/401 |
| 2014/0346662 A1* | 11/2014 | Rashed ............... G06F 17/5072 257/734 |
| 2015/0064869 A1* | 3/2015 | Hong ................. H01L 21/82382 438/283 |
| 2015/0076569 A1* | 3/2015 | Hong ................. H01L 29/6681 257/288 |
| 2015/0121329 A1* | 4/2015 | Fu ....................... G06F 17/5068 716/133 |

FOREIGN PATENT DOCUMENTS

| | | |
|---|---|---|
| KR | 10-2014-0036446 A | 3/2014 |
| KR | 10-2014-0059911 A | 5/2014 |

* cited by examiner

FIG. 5

| | AFP1 | AFP2 | AFP3 | AFP4 | DFP1 | DFP2 | DFP3 | TFP1 | TFP2 | TFP3 | TFP4 | CH | MetP | R |
|---|---|---|---|---|---|---|---|---|---|---|---|---|---|---|
| CASE 1 | 42 | 42 | 42 | 42 | 42 | 42 | - | 42 | 42 | 42 | 42 | 420 | 48 | 8.75 |
| CASE 2 | 42 | 42 | 42 | 42 | 48 | 42 | - | 42 | 45 | 45 | 42 | 432 | 48 | 9 |
| Sample #1 | 42 | 44 | 46 | 40 | 42 | 42 | - | 40 | 40 | 42 | 42 | 420 | 48 | 8.75 |
| Sample #2 | 44 | 44 | 48 | 48 | 46 | 42 | - | 40 | 45 | 45 | 42 | 444 | 48 | 9.25 |
| Sample #3 | 34 | 30 | 28 | 32 | 38 | 34 | 38 | 34 | 32 | 32 | 34 | 366 | 48 | 7.625 |

METHOD AND SYSTEM FOR DESIGNING SEMICONDUCTOR DEVICE

This application claims priority from Provisional Application No. 62/058,266 filed on Oct. 1, 2014 in the United States Patent and Trademark Office (USPTO), and from Korean Patent Application No. 10-2015-0037521 filed on Mar. 18, 2015 in the Korean Intellectual Property Office, the disclosures of which are incorporated by reference herein in their entirety.

BACKGROUND

1. Technical Field

Methods and systems consistent with the exemplary embodiments related to a method and system for designing a semiconductor device.

2. Description of the Related Art

A semiconductor device is manufactured by patterning devices and interconnects on a substrate such as a semiconductor wafer.

A semiconductor device can be manufactured by designing an integrated circuit (IC) using electronic design automation (EDA) which enables a designer to place and connect various components of a circuit to interact with each other. In other words, the layout of a semiconductor device can be created using EDA.

The layout of a semiconductor device includes circuit components, interconnect lines, and physical locations and sizes of various layers.

A semiconductor device can be manufactured by transferring this layout of the semiconductor device onto a semiconductor substrate. However, the layout of the semiconductor device has to go through a verification process before a semiconductor device is manufactured using the layout.

SUMMARY

It is an aspect of the present inventive concept to provide a method of designing a semiconductor device in such a way to optimize a track number and fin pitches in a standard cell.

It is also an aspect of the present inventive concept to provide a system for designing a semiconductor device in such a way to optimize a track number and fin pitches in a standard cell.

However, the aspects of the present inventive concept are not restricted to the ones set forth herein. The above and other aspects will become more apparent to one of ordinary skill in the art to which the present inventive concept pertains by referencing the detailed description of the present inventive concept given below.

According to an aspect of an exemplary embodiment, there is provided a method of designing a semiconductor device including providing a standard cell layout which comprises an active region and a dummy region; determining a first fin pitch between a first active fin and a second active fin in the active region and a second fin pitch between a first dummy fin and a second dummy fin in the dummy region; placing the first and second active fins in the active region and the first and second dummy fins in the dummy region using the first and second fin pitches; and verifying the standard cell layout.

According to another aspect of an exemplary embodiment, there is provided a method of designing a semiconductor device including providing a standard cell layout which comprises an active region and a dummy region; determining first and second fin pitches such that a plurality of active fins having the first fin pitch are placed in the active region and that a plurality of dummy fins having the second fin pitch are placed in the dummy region; determining a third fin pitch between an active fin of the plurality of active fins and a dummy fin of the plurality of dummy fins such that dummy fins are respectively placed on boundary lines of the standard cell layout which face each other in a direction of a cell height; and placing the active fins in the active region and the dummy fins in the dummy region using the first through third fin pitches.

According to still another aspect of the present inventive concept, there is provided a system for designing a semiconductor device including a processor; and a storage which stores an operation module executed using the processor, wherein the operation module receives a standard cell layout which comprises an active region and a dummy region, determines a first fin pitch between a first active fin and a second active fin in the active region and a second fin pitch between a first dummy fin and a second dummy fin in the dummy region, and places the first and second active fins in the active region and the first and second dummy fins in the dummy region using the first and second fin pitches.

BRIEF DESCRIPTION OF THE DRAWINGS

The above and other aspects and features will become more apparent by describing in detail exemplary embodiments thereof with reference to the attached drawings, in which:

FIG. 5 is a table illustrating figures of standard cell layouts designed according to the method of FIG. 1;

DETAILED DESCRIPTION OF EXEMPLARY EMBODIMENTS

Figure 1:
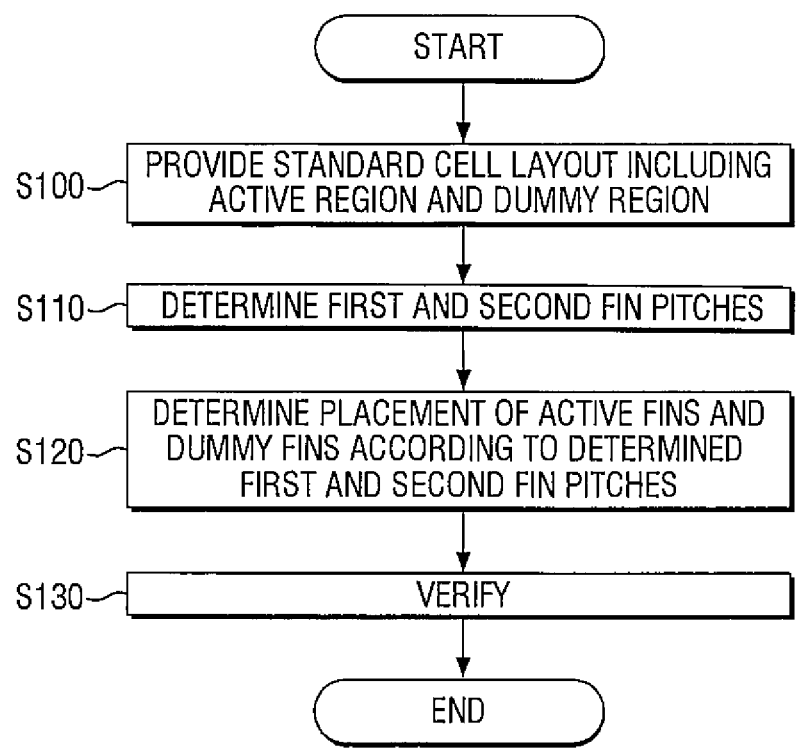
FIG. 1 is a flowchart illustrating a method of designing a semiconductor device according to an exemplary embodiment.

Exemplary embodiments will now be described more fully hereinafter with reference to the accompanying drawings, in which the exemplary embodiments are shown. The inventive concept may, however, be embodied in different forms and should not be construed as limited to the exemplary embodiments set forth herein. Rather, these exemplary embodiments are provided so that this disclosure will be thorough and complete, and will fully convey the scope of the inventive concept to those skilled in the art. The same reference numbers indicate the same components throughout the specification. In the attached figures, the thickness of layers and regions is exaggerated for clarity.

It will also be understood that when a layer is referred to as being "on" another layer or substrate, the layer can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the exemplary embodiments and especially in the context of the following claims are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which the inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

The present inventive concept will be described with reference to perspective views, cross-sectional views, and/or plan views, in which exemplary embodiments are shown. Thus, the profile of an exemplary view may be modified according to manufacturing techniques and/or allowances. That is, the exemplary embodiments are not intended to exact views shown but cover all changes and modifications that can be caused due to a change in manufacturing process. Thus, regions shown in the drawings are illustrated in schematic form and the shapes of the regions are presented simply by way of illustration and not as a limitation.

A method of designing a semiconductor device according to an exemplary embodiment will now be described with reference to FIGS. 1 through 5.

Figure 2:
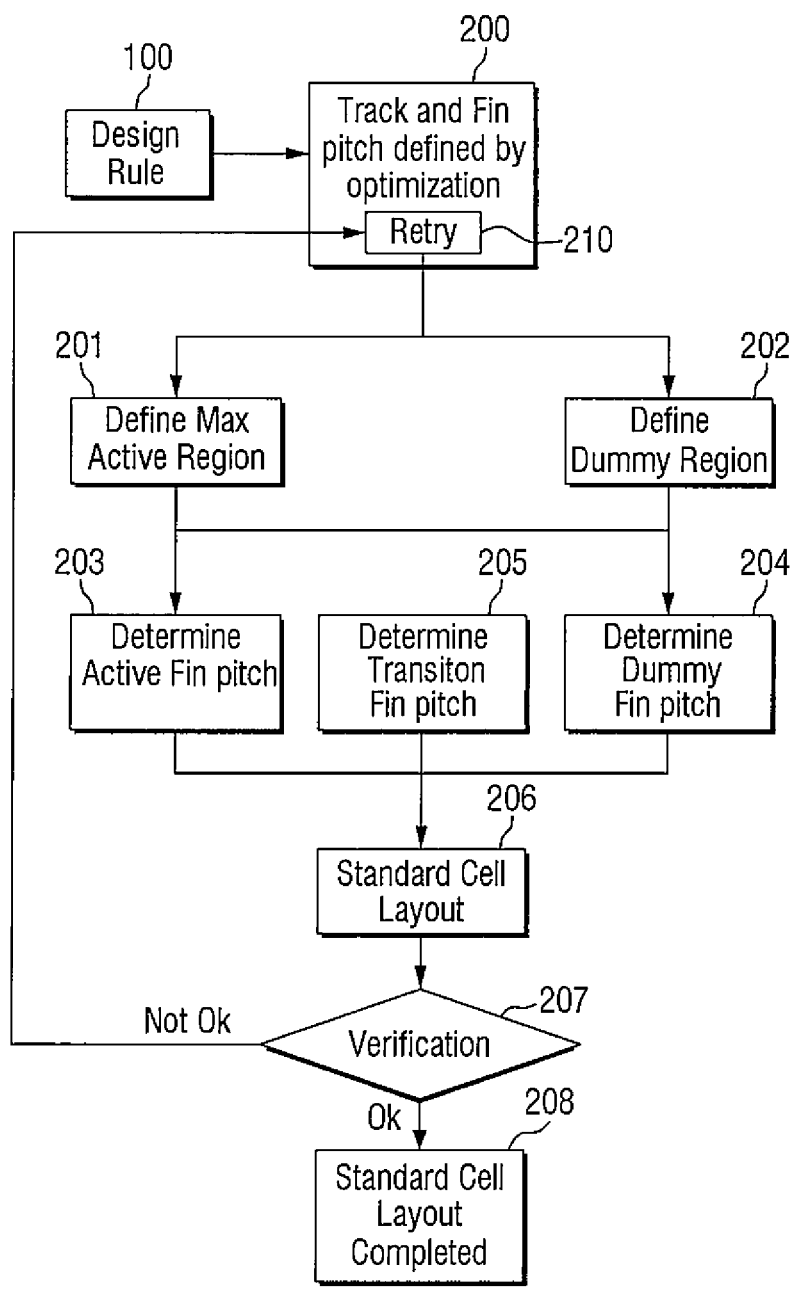
FIG. 2 is a block diagram illustrating the method of FIG. 1 in more detail.
Figure 3:
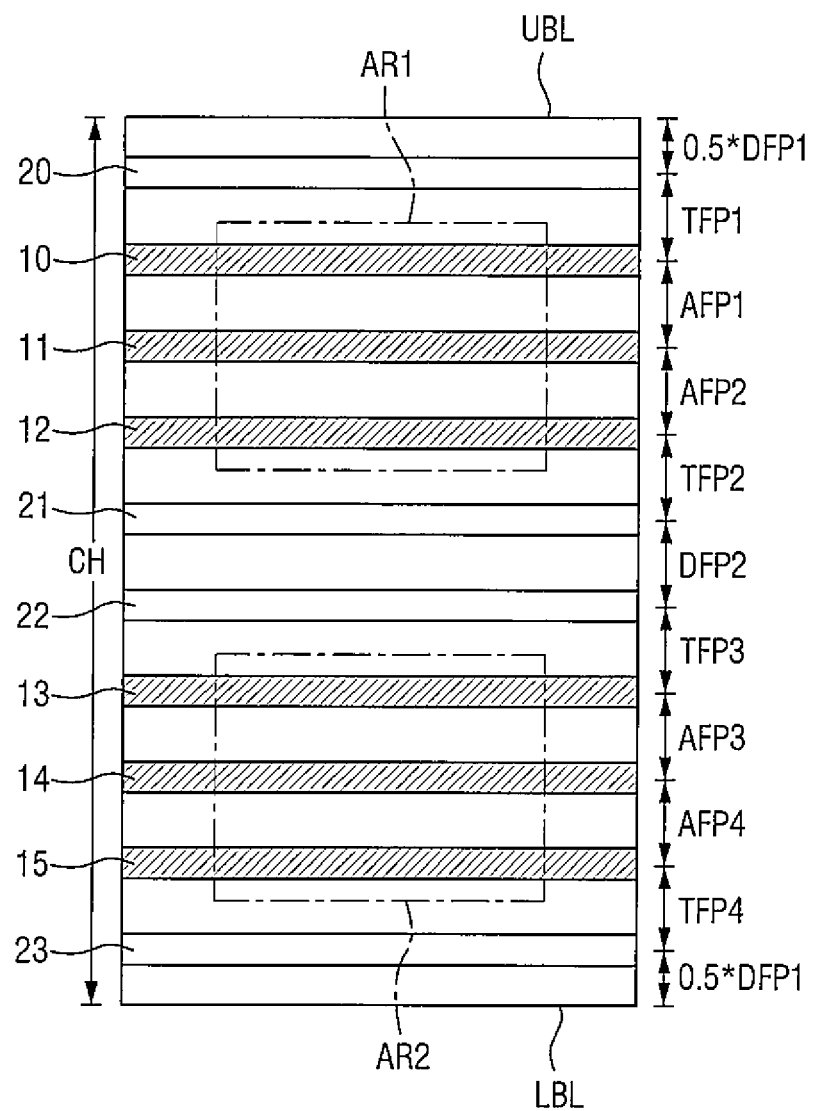
FIGS. 3 and 4 are diagrams of example standard cell layouts designed according to the method of FIG. 1.
Figure 4:
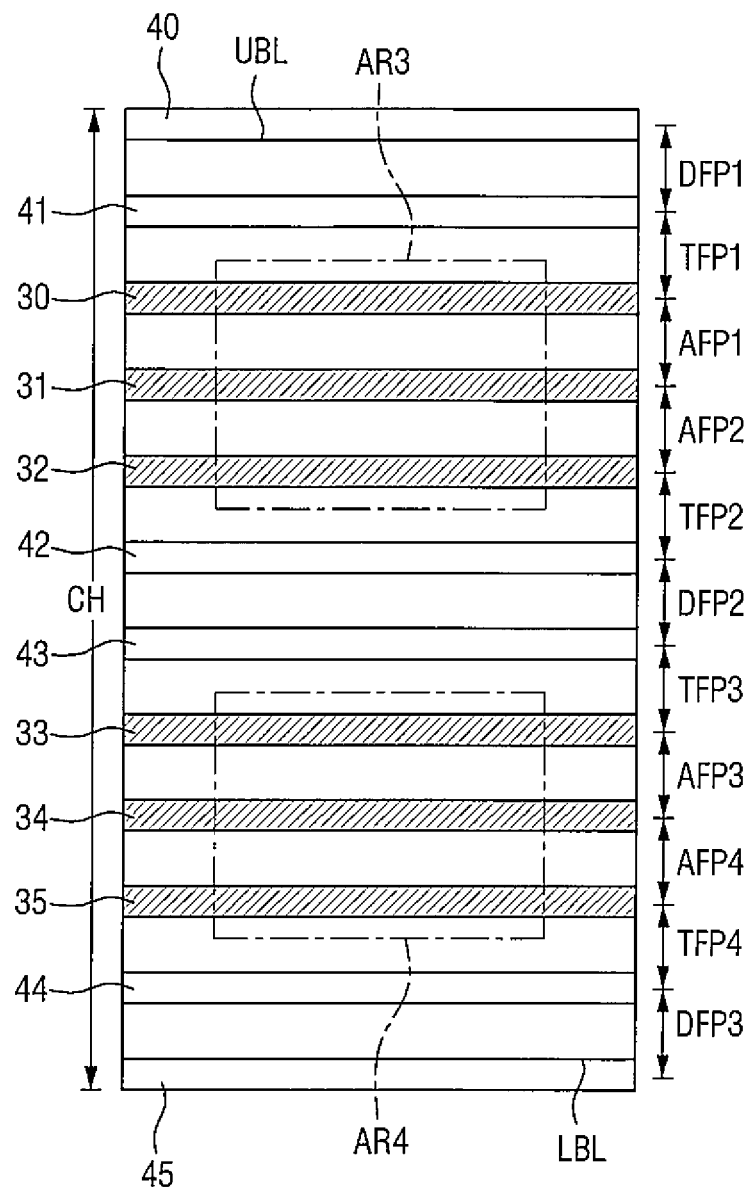

FIG. 1 is a flowchart illustrating a method of designing a semiconductor device according to an exemplary embodiment. FIG. 2 is a block diagram specifically illustrating the method of FIG. 1. FIGS. 3 and 4 are diagrams of example standard cell layouts produced according to the method of FIG. 1. FIG. 5 is a table illustrating figures of standard cell layouts produced according to the method of FIG. 1.

Referring to FIG. 1, in the method of designing a semiconductor device according to the current exemplary embodiment, a standard cell layout including an active region AR and a dummy region DR is provided (operation S100).

Then, a first fin pitch between a plurality of active fins in the active region AR and a second fin pitch between a plurality of dummy fins in the dummy region DR are determined (operation S110). The first fin pitch may be the same as or different from the second fin pitch.

Using the first and second fin pitches determined in the above process, a placement of the plurality of active fins in the active region AR, and a placement of the plurality of dummy fins in the dummy region DR are determined (operation S120).

The placement of the active fins and the dummy fins is verified in view of a cell height CH of the standard cell layout (operation S130).

A standard cell may be a basic cell for forming form a logic circuit. That is, the standard cell may be a circuit component that performs a specific function.

For example, the standard cell may represent, but is not limited to, a NAND circuit, a NOR circuit, an inverter circuit, or a flip-flop circuit, etc.

Referring ahead to FIG. 3, a first active region AR1 and a second active region AR2 are illustrated. (FIG. 2 will be described below.)

The first active region AR1 includes a first active fin 10, a second active fin 11, and a third active fin 12. The second active region AR2 includes a fourth active fin 13, a fifth active fin 14, and a sixth active fin 15.

A fin pitch between the first active fin 10 and the second active fin 11 is AFP1, and a fin pitch between the second active fin 11 and the third active fin 12 is AFP2. In addition, a fin pitch between the fourth active fin 13 and the fifth active fin 14 is AFP3, and a fin pitch between the fifth active fin 14 and the sixth active fin 15 is AFP4. Here, AFP1, AFP2, AFP3 and AFP4 may all be equal. However, this is only an example, and in some exemplary embodiments, one or more of AFP1, AFP2, AFP3 and AFP4 may be different from the remainder of the fin pitches. Alternatively, in some exemplary embodiments, each fin pitch AFP1, AFP2, AFP3 and AFP4 may be different from the others, such that no two fin pitches are the same.

The entire region excluding the first active region AR1 and the second active region AR2 may be defined as a dummy region DR. The dummy region DR may include a first dummy fin 20, a second dummy fin 21, a third dummy fin 22, and a fourth dummy fin 23.

No dummy fins are placed on boundary lines of the standard cell layout. For example, a fin pitch between an upper boundary line UBL and the first dummy fin 20 is 0.5×DFP1, and a fin pitch between a lower boundary line LBL and the fourth dummy fin 23 is 0.5×DFP1.

A fin pitch between the first dummy fin 20 and the first active fin 10 is TFP1, a fin pitch between the third active fin 12 and the second dummy fin 21 is TFP2, a fin pitch between the second dummy fin 21 and the third dummy fin 22 is DFP2, a fin pitch between the third dummy fin 22 and the fourth active fin 13 is TFP3, and a fin pitch between the sixth active fin 15 and the fourth dummy fin 23 is TFP4.

In the case of FIG. 3, AFP(x), DFP(y), and TFP(z) may have the same value. However, this is only an example, and in some exemplary embodiments, some or all of AFP(x), DFP(y), and TFP(z) may have different values from each other. A cell height CH of the standard cell layout is the sum of the values of AFP(x), DFP(y), and TFP(z).

That is, the cell height CH of the standard cell layout and each fin pitch can be determined using Equation (1):

$$CH = \sum_{x=1}^{\infty} AFP_x + \sum_{y=1}^{\infty} DFP_y + \sum_{z=1}^{\infty} TFP_z. \tag{1}$$

For example, to implement a cross-couple in a given standard cell layout, a diagonal contact plug should be designed within a standard cell in view of process margin. However, such a complicated structure is difficult to describe using design rules. Even if this complicated structure is described using design rules, it may be very difficult to create a layout in the same structure as the structure intended by a design rule developer.

Therefore, the method of designing a semiconductor device according to the present inventive concept may be used to design the optimal placement of a plurality of active fins and a plurality of dummy fins in view of the cell height CH of the standard cell layout.

First through $n^{th}$ metal lines may be designed to be placed in the standard cell layout. Here, the first through $n^{th}$ metal lines may be designed such that first through $(n-1)^{th}$ metal pitches between adjacent metal lines are equal. Alternatively, in some exemplary embodiments, some or all of the first through $(n-1)^{th}$ metal pitches may be different from the others.

In the case that the metal pitches between adjacent metal lines are equal, if each of the first through $(n-1)^{th}$ metal pitches is defined as MetP, R may be determined using Equation (2):

$$CH = R*MetP \tag{2}$$

where R is a rational number.

Referring to FIG. 5, example values of standard cell layouts are illustrated. In the method of designing a semiconductor device according to the present inventive concept, R may be, for example, 8.75, 9.25, 7.625, etc.

For example, when R is 8.75, AFP(x), DFP(y), and TFP(z) may have the same value, and each of the values of AFP(x), DFP(y), and TFP(z) may be 42 nm.

Referring to FIG. 4, a third active region AR3 and a fourth active region AR4 are illustrated.

The third active region AR3 includes a seventh active fin 30, an eighth active fin 31, and a ninth active fin 32. The fourth active region AR4 includes a tenth active fin 33, an eleventh active fin 34, and a twelfth active fin 35.

A fin pitch between the seventh active fin 30 and the eighth active fin 31 is AFP1, and a fin pitch between the eighth active fin 31 and the ninth active fin 32 is AFP2. In addition, a fin pitch between the tenth active fin 33 and the eleventh active fin 34 is AFP3, and a fin pitch between the eleventh active fin 34 and the twelfth active fin 35 is AFP4. Here, AFP1, AFP2, AFP3, and AFP4 may be equal pitches. However, this is only an example, and in some exemplary embodiments, some or all of AFP1, AFP2, AFP3, and AFP4 may have different pitch values from each other.

The entire region excluding the third active region AR3 and the fourth active region AR4 may be defined as a dummy region DR. The dummy region DR may include a fifth dummy fin 40, a sixth dummy fin 41, a seventh dummy fin 42, an eighth dummy fin 43, a ninth dummy fin 44, and a tenth dummy fin 45.

Here, unlike in the exemplary embodiment shown in FIG. 3, dummy fins may be placed on boundary lines of a standard cell layout. That is, the fifth dummy fin 40 may be placed on an upper boundary line UBL of the standard cell layout, and the tenth dummy fin 45 may be placed on a lower boundary line LBL of the standard cell layout. A fin pitch between the fifth dummy fin 40 and the sixth dummy fin 41 is DFP1, and a fin pitch between the ninth dummy fin 44 and the tenth dummy fin 45 is DFP3.

A fin pitch between the sixth dummy fin 41 and the seventh active fin 30 is TFP1, a fin pitch between the ninth active fin 32 and the seventh dummy fin 42 is TFP2, a fin pitch between the seventh dummy fin 42 and the eighth dummy fin 43 is DFP2, a fin pitch between the eighth dummy fin 43 and the tenth active fin 33 is TFP3, and a fin pitch between the twelfth active fin 35 and the ninth dummy fin 44 is TFP4.

In the case of FIG. 4, AFP(x), DFP(y), and TFP(z) may have different values. However, this is only an example, and in some exemplary embodiments, AFP(x), DFP(y), and TFP(z) may have the same values. A cell height CH of the standard cell layout may be the sum of the values of AFP(x), DFP(y), and TFP(z).

That is, the cell height CH of the standard cell layout and each fin pitch can be determined using Equation (1) described above.

First through $n^{th}$ metal lines may be designed to be placed in the standard cell layout. Here, the first through $n^{th}$ metal lines may be designed such that first through $(n-1)^{th}$ metal pitches between adjacent metal lines are equal. Alternatively, in some exemplary embodiments, some or all of the first through $(n-1)^{th}$ metal pitches may be different from the others.

In the case that the metal pitches between adjacent metal lines are equal, if each of the first through $(n-1)^{th}$ metal pitches is defined as MetP, R may be determined using Equation (2) described above.

Referring to FIG. 5, when R is 9, AFP(x) may be 42 nm, DFP(y) may be 42 nm or 48 nm, and TFP(z) may be 42 nm or 45 nm.

In this way, each of the values of AFP(x), DFP(y), and TFP(z) may be determined by substituting an appropriate rational number for R. Alternatively, after the values of AFP(x) and DFP(y) are determined, the value of TFP(z) may be determined based on a value of the cell height CH.

The method will now be described in greater detail with reference to FIG. 2.

First, an integrated circuit (IC) is designed according to design rules (operation 100).

Designing an IC according to design rules may be disadvantageous in terms of scaling but advantageous in terms of implementing the IC.

If an IC designer designs an IC layout that violates design rules, it is doubtful whether the IC layout that violates the design rules will be implemented into an actual IC. That is, an IC manufacturer might not be able to implement an IC layout that violates the design rules into an actual IC by optimizing a manufacturing process. In such a case, the IC designer should redesign the IC layout.

On the other hand, the IC manufacturer might be able to implement an IC layout that violates design rules into an actual IC by optimizing a manufacturing process. The reason why the IC manufacturer can implement the IC layout that violates the design rules is that the IC manufacturer can implement complicated patterns that violate the design rules by adjusting, for example, manufacturing process conditions.

In addition, the IC manufacturer can use, for example, optical proximity correction (OPC) when manufacturing a photomask using the IC layout. That is, the IC manufacturer can implement the complicated patterns that violate the design rules by adjusting conditions for the operation of manufacturing a photomask.

While the IC designer designs an IC layout based on design rules, the IC manufacturer implements an IC by optimizing an actual manufacturing process. Therefore, the IC manufacturer can optimize, in terms of a manufacturing process, a structure that violates design rules or a structure that is too complicated to be expressed as design rules.

When a standard cell layout is designed, if the placement of a plurality of active fins and a plurality of dummy fins is designed after an active region AR and a dummy region DR are defined, an optimal cell height CH can be determined, and an optimal track number TN can be determined based on metal pitches MetP.

Therefore, the size of a standard cell can be reduced as compared with the standard cell layout designed according to design rules.

The IC designer determines an optimal track number TN and fin pitches corresponding to the optimum track number TN (operation 200). Here, the optimal track number TN and the fin pitches are determined using the above-described method.

That is, a maximum active region AR is defined (operation 201), and a dummy region DR is defined (operation 202). Using the above-described method, an active fin pitch is determined (operation 203), and a dummy fin pitch is determined (operation 204). In addition, a fin pitch between the dummy fin and the active fin is determined (operation 205).

Accordingly, the IC designer designs a standard cell layout (operation 206). The standard cell layout is then verified (operation 207). If the standard cell layout has been optimized (operation 207; "Ok"), standard cell layout is completed (operation 208). If it is determined in the verifying of the standard cell layout (operation 207) that the standard cell layout has not been optimized (operation 207; "Not OK"), the above method is retried (operation 210).

In some exemplary embodiments, a design rule manual including design rules for designing an IC may further be provided by changing the order of designing a standard cell layout.

Design rules may be a number of variables provided by the IC developer. Using the design rules, the IC designer can verify the correctness of a photomask set that is to be created based on an IC layout.

The design rules may include, for example, a ground rule and a special structure. Here, the special structure may denote a structure that applies a margin more strictly than the ground rule. That is, the special structure is also a kind of design rule.

The design rules may include, for example, a width rule, a minimum area rule, a space rule, an enclosure rule, a symmetry rule, and/or an alignment rule, etc.

The design rules may be provided in the form of a document to the IC designer.

A data file about a standard cell layout may be in the form of a graphic database system (GDS) file, a GDS instance file, and a hard macro file, etc. However, the data file is not limited thereto. That is, a data file about a standard cell layout may be in the form of any graphic file that can represent a circuit layout.

In other words, a standard cell layout may be provided to the IC designer in the form of one of a GDS, a GDS instance, and a hard macro.

In some exemplary embodiments, a standard cell layout may be provided to the IC designer by the IC manufacturer through a system. The system may be predetermined.

A system for designing a semiconductor device will now be described with reference to FIG. 6.

Figure 6:
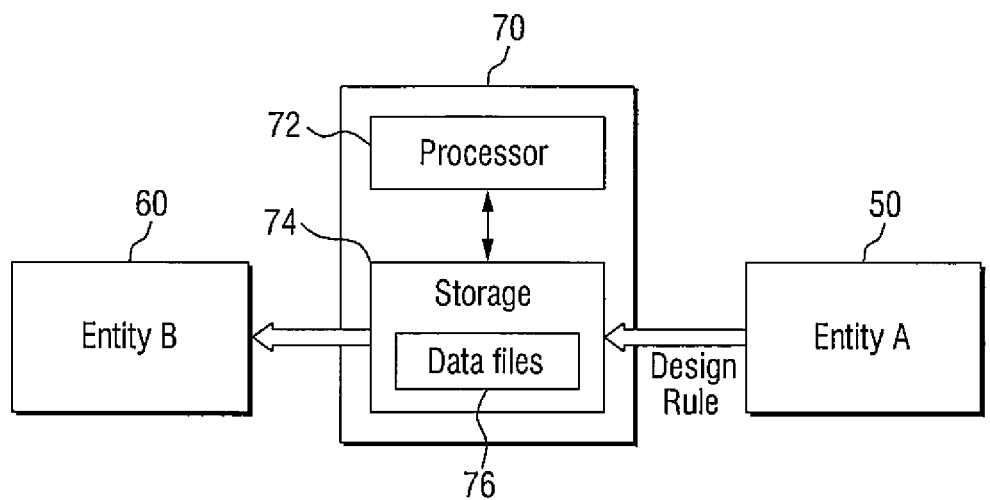
FIG. 6 is a block diagram of a system for designing a semiconductor device according to an exemplary embodiment.

FIG. 6 is a block diagram of a system 70 for designing a semiconductor device according to an exemplary embodiment.

Referring to FIG. 6, the designing system 70 may include a processor 72 and a storage 74.

The storage 74 may store data files 76 received from a first entity 50 (e.g., an IC manufacturer). The first entity 50 may upload the data files 76 including standard cell layouts designed as described above to the storage 74.

The data files 76 thus stored in the storage 74 may be downloaded to a second entity 60 (e.g., an IC designer). That is, the data files 76 including the standard cell layouts may be provided to the second entity 60.

The processor 72 may be used by the system 70 to perform an operation in the process of uploading or downloading these data files 76. The operation may be predetermined.

In some exemplary embodiments, the storage 74 may further store design rules provided from the first entity 50 to the second entity 60. That is, the design rules may also be provided from the first entity 50 to the second entity 60 via the designing system 70.

In some exemplary embodiments, the designing system 70 may be implemented using, for example, a web interface. However, the implementation environment is not limited thereto, and an implementation environment of the designing system 70 can be modified as desired.

Referring back to FIG. 2, the placement of a plurality of active fins in the active region AR and the placement of a plurality of dummy fins in the dummy region DR are determined using the received design rules and standard cell layout. Here, the placement of the active fins in the active region AR and the placement of the dummy fins in the dummy region DR may be determined by determining each fin pitch.

Whether an optimal standard cell layout has been determined may be verified in the process of designing the standard cell layout.

A method of designing a semiconductor device according to another exemplary embodiment will now be described.

Figure 7:
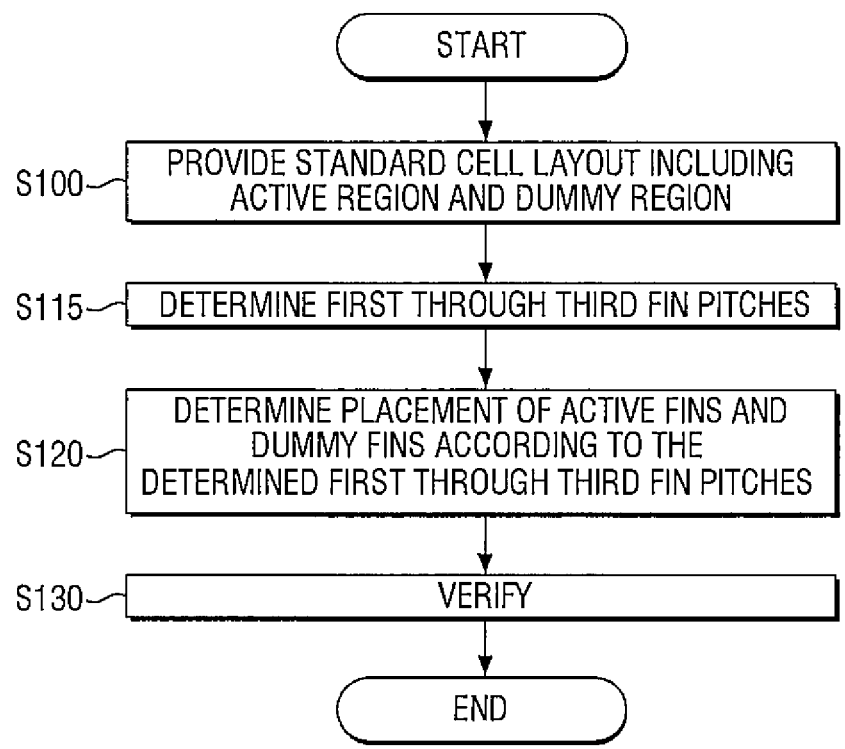
FIG. 7 is a flowchart illustrating a method of designing a semiconductor device according to another exemplary embodiment.

FIG. 7 is a flowchart illustrating a method of designing a semiconductor device according to another exemplary embodiment.

Referring to FIG. 7, in the method of designing a semiconductor device, a standard cell layout including an active region AR and a dummy region DR is provided (operation S100).

Then, a first fin pitch P1 and a second fin pitch P2 are determined such that a plurality of active fins having the first fin pitch P1 are placed in the active region AR and that a plurality of dummy fins having the second fin pitch P2 are placed in the dummy region DR. In addition, a third fin pitch P3 between an active fin and a dummy fin is determined such that dummy fins are respectively placed on boundary lines of the standard cell layout which face each other in the direction of a cell height CH (operation S115).

Specifically, the first through third fin pitches P1 through P3 may be determined such that a first dummy fin DF1 and a second dummy fin DF2 are placed on boundary lines of the standard cell layout which face each other in the direction of the cell height CH, that a plurality of active fins are placed in the active region AR, and that a plurality of dummy fins are placed in the dummy region DR.

Then, a placement of a plurality of active fins in the active region AR is determined, and a placement of a plurality of dummy fins in the dummy region DR is determined (operation S120).

Finally, the placement design of the standard cell layout is verified (operation S130).

Here, the first through third fin pitches P1 through P3 may be different. Alternatively, in some exemplary embodiments, one or more of the first through third fin pitches P1 through P3 may be different from the others.

Figure 8:
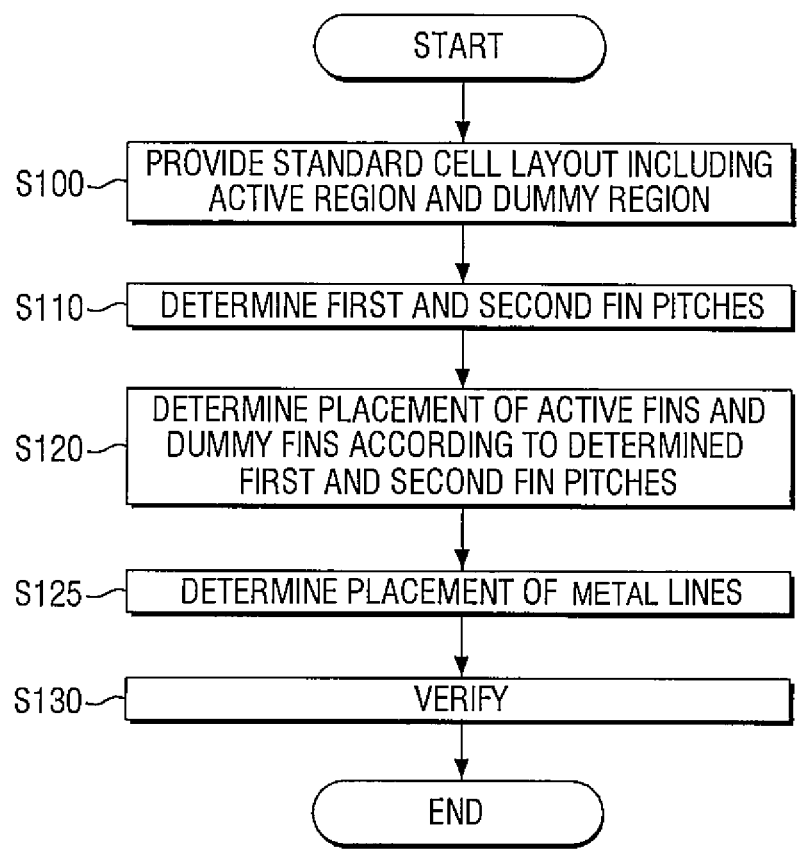
FIG. 8 is a flowchart illustrating a method of designing a semiconductor device according to another exemplary embodiment.

FIG. 8 is a flowchart illustrating a method of designing a semiconductor device according to another exemplary embodiment.

Referring to FIG. 8, in the method of designing a semiconductor device, a standard cell layout including an active region AR and a dummy region DR is provided (operation S100). The method of designing a semiconductor device according to the current exemplary embodiment may further include defining the active region AR and the dummy region DR using a marker.

A first fin pitch P1 and a second fin pitch P2 are determined such that a plurality of active fins having the first fin pitch P1 are placed in the active region AR and that a plurality of dummy fins having the second fin pitch P2 are placed in the dummy region DR (operation S110).

Then, a placement of a plurality of active fins in the active region AR is determined, and a placement of a plurality of dummy fins in the dummy region DR is determined (operation S120).

A placement of first through $n^{th}$ metal lines in the standard cell layout is determined (operation S125). Here, the placement of the first through $n^{th}$ metal lines may be determined such that first through $(n-1)^{th}$ metal pitches between adjacent metal lines are equal. Alternatively, in some exemplary embodiments, some or all of the first through $(n-1)^{th}$ metal pitches may be different from the others.

In the case that the metal pitches between adjacent metal lines are equal, if each of the first through $(n-1)^{th}$ metal pitches is defined as MetP, R may be determined using Equation (2) above.

Finally, the placement design of the standard cell layout is verified (operation S130).

In the methods of designing a semiconductor device according to the above-described exemplary embodiments, a standard cell layout or a logic block layout can be updated or redesigned according to changes in a manufacturing process.

If a standard cell layout in a graphic data format is not used, it requires a very long time to update a logic block layout. That is, a design rule manual is updated, and a process design kit (PDK) is updated. Then, standard cell layouts are updated using the updated PDK, and logic block layouts are updated using the updated standard cell layouts.

Figure 9:
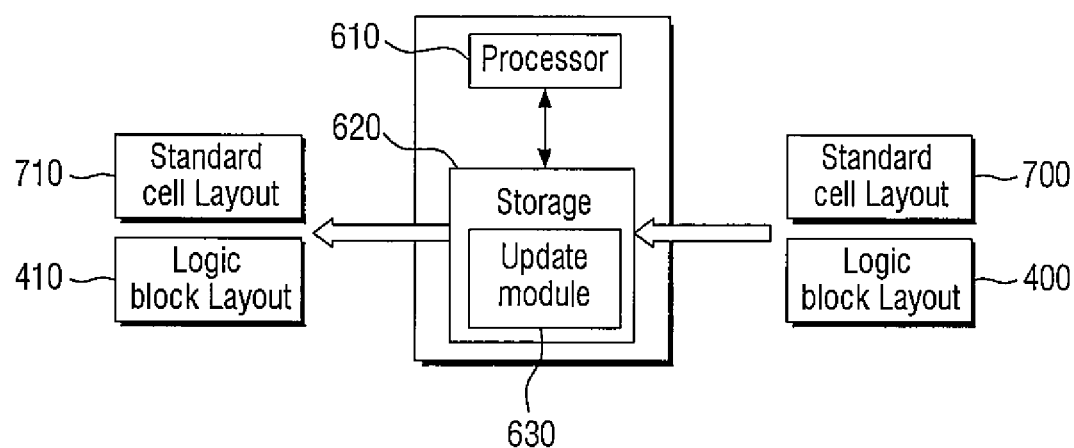
FIG. 9 is a block diagram of a system for designing a semiconductor device according to another exemplary embodiment.

FIG. 9 is a block diagram of a system 600 for designing a semiconductor device according to another exemplary embodiment.

Referring to FIG. 9, the designing system 600 may include a processor 610 and a storage 620.

The storage 620 may store an update module 630. The update module 630 may perform the above-described operation of designing and updating a standard cell layout.

Specifically, the update module 630 may receive as input a standard cell layout 700 and a logic block layout 400 and may form a standard cell layout 710 and a logic block layout 401 by calculating a fin pitch of each of active fins and dummy fins in a standard cell layout.

The processor 610 may be used by the update module 630 to perform this operation.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the exemplary embodiments be considered in all respects as illustrative and not restrictive, reference being made to the appended claims rather than the foregoing description to indicate the scope of the inventive concept.

What is claimed is:

1. A method of designing a semiconductor device, the method comprising:
   providing a standard cell layout which comprises a plurality of active regions and a plurality of dummy regions, wherein at least one of the plurality of the dummy regions is interposed between the plurality of the active regions;
   determining, using at least one microprocessor, a first fin pitch between a first active fin and a second active fin in at least one active region of the plurality of active regions and a second fin pitch between a first dummy fin and a second dummy fin in the at least one dummy region that is interposed between the plurality of active regions;
   placing, using the at least one microprocessor the first and second active fins in the at least one active region and the first and second dummy fins in the at least one dummy region that is interposed between the plurality of active regions using the first and second fin pitches;
   verifying, using the at least one microprocessor, the placement of the active fins and the dummy fins in the standard cell layout; and
   updating the standard cell layout based on the verifying.

2. The method of claim 1, wherein the first fin pitch and the second fin pitch are different.

3. The method of claim 1, further comprising determining a third fin pitch between the second active fin and the first dummy fin.

4. The method of claim 3, wherein the first through third fin pitches are different from one another.

5. The method of claim 1, further comprising placing first through n-th metal lines in the standard cell layout, wherein the first through n-th metal lines are placed such that first through (n−1)-th metal pitches between adjacent metal lines are equal.

6. The method of claim 5, wherein a cell height of the standard cell layout is CH, each of the first through (n−1)-th metal pitches is MetP, and CH=R×MetP, where R is a rational number.

7. The method of claim 6, wherein a pitch between the second active fin and the first dummy fin is a fourth fin pitch, wherein the first fin pitch, the second fin pitch, and the fourth fin pitch are different from one another.

8. The method of claim 7, further comprising placing a third dummy fin on at least one boundary line of the standard cell layout.

9. The method of claim 1, further comprising defining the plurality of active regions and the at least one dummy region using a marker.

10. A method of designing a semiconductor device, the method comprising:
    providing a standard cell layout which comprises a plurality of active regions and at least one dummy region;
    determining, using at least one microprocessor, first and second fin pitches such that a plurality of active fins having the first fin pitch are placed in at least one active region of the plurality of active regions and that a plurality of dummy fins having the second fin pitch are placed in the dummy region;

determining, using the at least one microprocessor, a third fin pitch between an active fin of the plurality of active fins and a dummy fin of the plurality of dummy fins such that dummy fins are respectively placed on boundary lines of the standard cell layout which face each other in a direction of a cell height;

placing, using the at least one microprocessor, the active fins in the at least one active region and the dummy fins in the dummy region using the first through third fin pitches;

verifying, using the at least one microprocessor, the placement of the active fins and dummy fins in the standard cell layout; and updating the standard cell layout based on the verifying.

11. The method of claim 10, wherein the first through third fin pitches are different from one another.

12. The method of claim 10, wherein in the placing the active fins in the at least one active region and the dummy fins in the dummy region, a first dummy fin and a second dummy fin are respectively placed on the boundary lines, the active fins are placed in the at least one active region, and the dummy fins are placed in the dummy region.

13. The method of claim 10, further comprising placing a plurality of metal lines in the standard cell layout, wherein the metal lines are placed such that metal pitches between adjacent metal lines are equal.

14. The method of claim 13, wherein the cell height is CH, each of the metal pitches is MetP, and CH=R×MetP, where R is a rational number.

15. A system for designing a semiconductor device, the system comprising:

a processor; and a storage which stores an operation module executed using the processor, wherein the operation module receives a standard cell layout which comprises a plurality of active regions and at least one dummy region, determines a first fin pitch between a first active fin and a second active fin in at least one active region of the plurality of active regions and a second fin pitch between a first dummy fin and a second dummy fin in the dummy region, and places the first and second active fins in the at least one active region and the first and second dummy fins in the dummy region using the first and second fin pitches, wherein the operation module further determines a third fin pitch between the second active fin and the first dummy fin, wherein the operation module places a third dummy fin on at least one boundary line of the standard cell layout, wherein the operation module verifies the placement of the active fins and dummy fins in the standard cell layout, and updates the standard cell layout based on the verification.

16. The system of claim 15, wherein the first fin pitch and the second fin pitch are different.

17. The system of claim 15, wherein the first through third fin pitches are different from one another.

18. The system of claim 15, wherein the operation module further places first through n-th metal lines in the standard cell layout, wherein the first through n-th metal lines are placed such that first through (n−1)-th metal pitches between adjacent metal lines are equal.

* * * * *